United States Patent [19]

Berger

[11] Patent Number: 5,433,593
[45] Date of Patent: Jul. 18, 1995

[54] GEAR PUMP MOUNTING ASSEMBLY FOR THERMOPLASTIC EXTRUSION LINE

[75] Inventor: Daniel E. Berger, Charlotte, N.C.

[73] Assignee: LCI Corporation, Charlotte, N.C.

[21] Appl. No.: 252,824

[22] Filed: Jun. 2, 1994

[51] Int. Cl.6 .......................... B29B 7/42; B29B 7/58
[52] U.S. Cl. .................................... 425/186; 425/188; 425/190; 425/192 R; 425/204; 425/205; 366/77; 366/79; 366/190
[58] Field of Search ............... 425/183, 186, 188, 190, 425/204, 205; 366/79, 190, 77, 192 R, 461

[56] References Cited

U.S. PATENT DOCUMENTS

| | | |
|---|---|---|
| 3,649,147 | 3/1972 | Fritsch . |
| 4,013,745 | 3/1977 | Brinkmann et al. . |
| 4,101,613 | 7/1978 | Norwood . |
| 4,209,476 | 6/1980 | Harris . |
| 4,452,750 | 6/1984 | Handwerk et al. . |
| 4,478,775 | 10/1984 | Endo et al. . |
| 4,501,498 | 2/1985 | McKelvey . |
| 4,663,103 | 5/1987 | McCullough et al. . |
| 4,680,002 | 7/1987 | Hehe .................... 425/186 |
| 4,890,996 | 1/1990 | Shimizu ................ 425/204 |
| 5,020,914 | 6/1991 | Wurl et al. ........... 425/190 |
| 5,122,315 | 6/1992 | Darley . |
| 5,265,955 | 11/1993 | Guggiari .............. 425/204 |

*Primary Examiner*—Khanh P. Nguyen
*Attorney, Agent, or Firm*—Shefte, Pinckney & Sawyer

[57] ABSTRACT

In a thermoplastic material extrusion line having a melt extruder, a gear pump, and a die aligned with one another, the gear pump is supported on a hinged articulable arm for swinging movement into and out of operative disposition in alignment with the extruder to simplify realignment of the gear pump with the extruder and the die whenever it becomes necessary to remove the gear pump from the line for maintenance or service.

8 Claims, 5 Drawing Sheets

GEAR PUMP MOUNTING ASSEMBLY FOR THERMOPLASTIC EXTRUSION LINE

BACKGROUND OF THE INVENTION

The present invention relates generally to apparatus and methods for extruding thermoplastic material and, more particularly, to an apparatus for swingable mounting of a gear pump in a thermoplastic extrusion line of the type having a gear pump interposed between a melt extruder and an extrusion die.

Many various forms of thermoplastic polymeric material are conventionally extruded into a wide variety of products including sheets, film, rods, tubes, and strands, as well as various other products. Basically, the extrusion process involves melting of the thermoplastic material employed, and sufficient pressurization of the melted material to cause it to flow, at a desired rate, through an appropriate die to form the intended end product. An important determination of the quality of the end product is its conformity, within acceptable tolerances, to predetermined dimensional and weight specifications. As a general principle, the quality of an extruded product tends to decrease as the extrusion rate increases. Over the years, it has therefore been an ongoing problem in the industry in striking an acceptable balance between an economical rate of extrusion and an acceptable quality of the extruded product.

Conventional apparatus for extruding thermoplastic material typically includes a cylindrical barrel in which is rotatably disposed a conveying screw. The thermoplastic material is fed in a solid pellet or powder form into the barrel at one end and conveyed to the other end of the barrel by rotation of the screw. The heat required to transform the thermoplastic material from a solid at room temperature to a molten material at the desired extrudate temperature is typically generated by equipping the extruder with heating elements.

Conventional extruders are widely recognized to be disadvantageously subject to undesirable deviations in the quality of the extruded product. While the volumetric input of thermoplastic material to the extruder and the operational parameters of the extruder, e.g., rotational speed of the screw and temperature of the extruder heaters, may be maintained substantially constant, variations in the thermoplastic material such as its density and viscosity, as well as variations in the operating conditions of the extruder such as uneven temperature distribution and backpressurization, cause unacceptable variations in the quality of the extruded product exceeding established tolerances. When such variations result in an extruded product exceeding established thickness specifications by more than the acceptable tolerance, the extruder utilizes an excessive amount of thermoplastic material and, in turn, the profitability of the extruder suffers. When such variations result in an extruded product of a thickness less than established thickness specifications by more than the acceptable tolerance, the product is defective and unsalable.

In recent years, various techniques and approaches have been developed to attempt to control deviations in the output of extrusion systems to avoid these problems. One such approach is to utilize a gear pump following the extruder to meter the delivery of the molten thermoplastic material to the forming die. The basic construction and operation of gear pumps is well known, basically including a pair of counter-rotating intermeshing gears driven within a pump housing to transport the molten thermoplastic material in a positive displacement manner by entrapping the material between the teeth of the gears. As a result, the volumetric output of a gear pump is a function of its operational speed and is substantially unaffected by pressure surges and fluctuations in the input flow of thermoplastic material from the extruder. As a result, the use of a gear pump reduces variations in the quality of the extruded product, both on short term and long term bases, by delivering a substantially uniform volumetric flow of thermoplastic material to the die of the extrusion system. Representative examples of gear pump-assisted thermoplastic extrusion lines are disclosed in U.S. Pat. Nos. 3,649,147; 4,013,745; 4,101,613; 4,209,476; 4,452,750; 4,478,775; 4,501,498; 4,663,103; and 5,122,315.

As persons skilled in the art will recognize, one of the important factors affecting the proper functioning of a gear pump in such an extrusion line is that the gear pump must be mounted in precise proper alignment with the output end of the melt extruder and the input side of the die. Typically, the gear pump is driven by its own individual electric motor through a gear reducer unit which enables the speed of the gear pump to be selectively adjusted in relation to the particular process requirements of the extrusion line. Because of the need to maintain proper alignment of the gear pump, it has been common practice in the past to mount the gear pump/reducer unit/drive motor assembly to its own respective base plate or frame which, in turn, is securely mounted to the floor between the melt extruder and the die once the gear pump has been properly aligned therewith during set-up of the extrusion line, thereby to best ensure that the alignment of the gear pump is maintained during the course of processing. Because periodic maintenance or servicing of the gear pump assembly may be necessary, one alternative mounting system which has been employed in recent years is to utilize a wheeled cart having lockable casters on which the gear pump, its drive motor, and gear reducer unit may be mounted. The cart enables the gear pump to be disassembled from the extruder and the die when necessary so that the entire cart structure can be simply wheeled out of the extrusion line for maintenance or other servicing. While this cart mounting arrangement improves the convenience of maintenance and servicing of the gear pump assembly, it still suffers the same disadvantage of fixed gear pump mounting systems, namely, that the gear pump must be precisely realigned with the output end of the extruder when the gear pump is returned to service, just as during the original set-up of the extrusion line, which can be a time consuming task and necessarily involves a corresponding loss of extrusion production.

SUMMARY OF THE INVENTION

It is accordingly an object of the present invention to provide an arrangement for mounting a gear pump in a thermoplastic extrusion line which overcomes the disadvantages of the prior art. A particular object of the present invention is to provide a gear pump mounting assembly which, once initially set up in conjunction with a melt extruder with the gear pump in proper relative alignment, the gear pump can be easily removed from and returned to the extrusion line without need for realignment with the extruder. A more particular object of the present invention is to provide a gear pump mounting assembly by which the gear pump may be swung pivotably into and out of aligned disposition with the extruder.

Briefly summarized, these objects of the present invention are accomplished by providing a gear pump mounting assembly which supports the gear pump for swinging movement into and out of operative disposition in alignment with the extruder. Basically, the mounting assembly comprises a frame for fixed disposition adjacent the extruder, an articulable arm extending from the frame, and a support structure affixed to the arm for mounting the gear pump to be articulably movable with the arm into and out of an operative position aligned with the extruder.

The articulable arm of the present mounting assembly includes at least one hinge device for pivoting movement of the gear pump, preferably a plurality of the hinge devices being utilized to increase the articulability of the arm and, in turn, the manipulability of the gear pump.

The frame preferably includes a base for stationary affixation to a floor or other supporting surface in common with the extruder so that the relative disposition of the gear pump to the extruder is controlled exclusively by the articulated movement of the arm. In this manner, during articulated movement of the gear pump from its operative disposition aligned with the extruder, the gear pump is maintained in correct orientation for realignment with the extruder upon reversal of the articulated movement.

The support structure of the articulable arm includes a mount for a gear pump drive assembly to which the gear pump is fixed. The drive assembly is equipped with a "female" drive shaft having an axial bore for receiving an input shaft of the gear pump upon mounting of the gear pump to the support structure, the axial bore of the drive shaft and the input shaft of the gear pump mating with one another, e.g., by a spline arrangement, for integral driving connection thereof. The gear pump drive assembly preferably comprises a drive motor and a gear reduction unit, the gear pump being affixed to the gear reduction unit.

DETAILED DESCRIPTION OF THE PREFERRED EMBODIMENT

Figure 1:
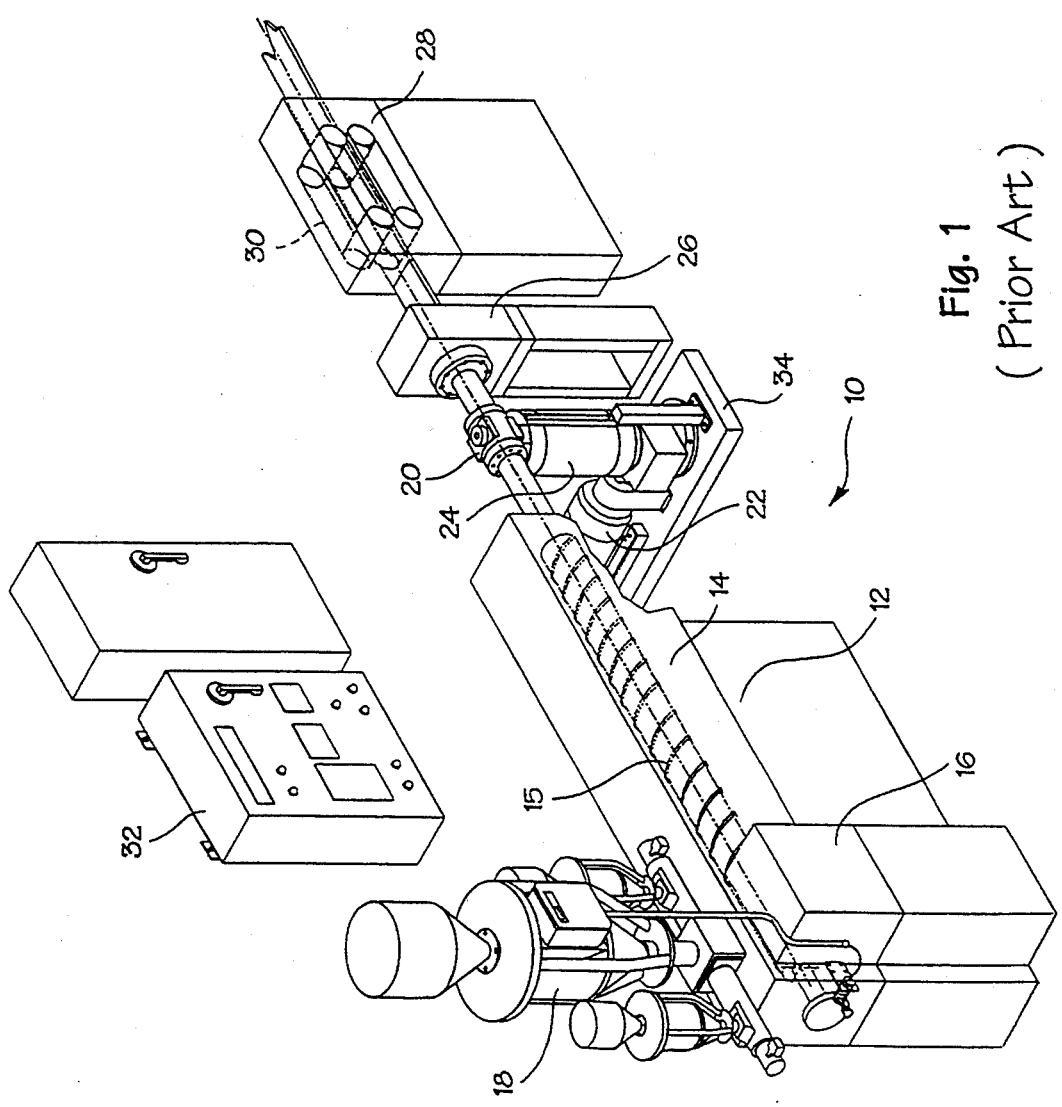
FIGS. 1, 2 and 3 are generally schematic perspective views of typical prior art extrusion lines depicting differing conventional manners utilized for mounting a gear pump in an extrusion line.
Figure 2:
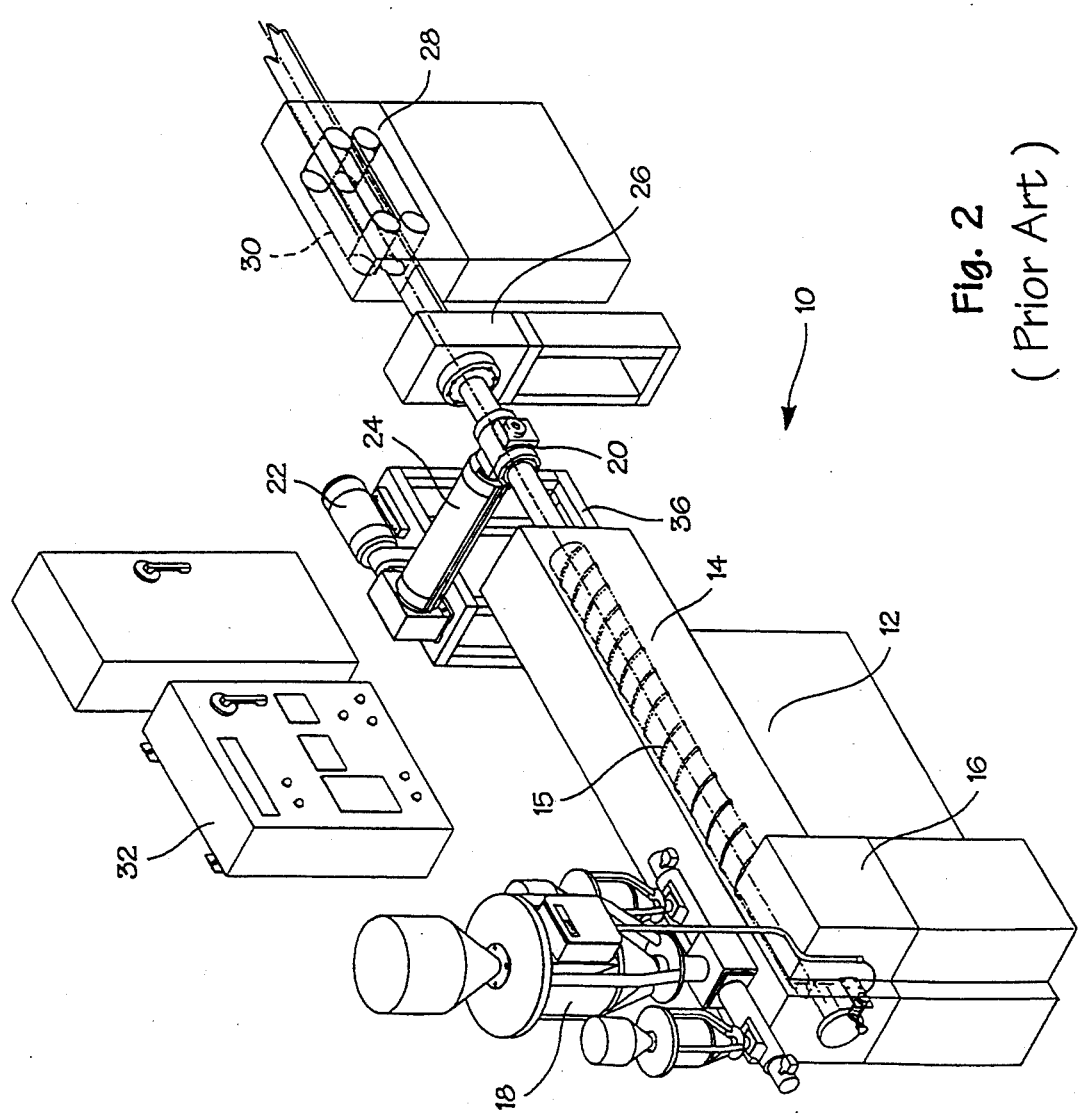
Figure 3:
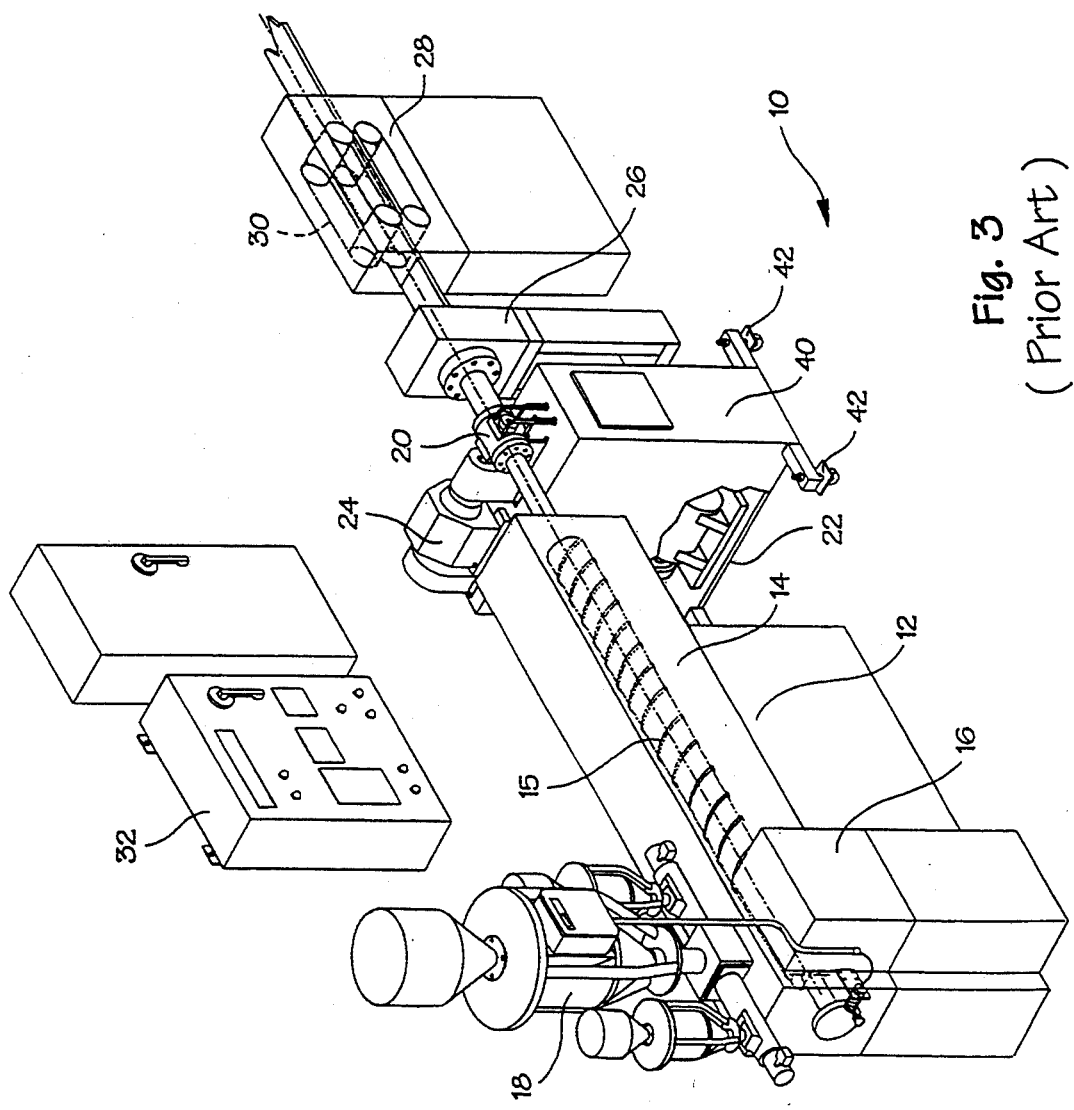

Referring now to the accompanying drawings and initially to FIGS. 1-3, prior art extrusion lines of the type described above are depicted utilizing three differing conventional gear pump mounting structures. In each figure, an extruder system 10 is shown which basically utilizes a conventional screw-type melt extruder assembly 12 having a horizontally disposed cylindrical housing or barrel 14 within which an elongate threaded conveyor screw 15 is rotatably driven by a variable speed screw motor 16 for transporting thermoplastic material through the extruder barrel. The extruder 12 is equipped with suitable means (not shown) for heating thermoplastic charge material to its melting point as the material is conveyed by the screw through the barrel 14. Any conventional heating arrangement may be utilized, e.g., barrel heaters or an internal heater cartridge within the conveyor screw or both.

One end of the extruder barrel 14 is formed with a material intake opening (not shown) which communicates with a gravimetric weighing hopper apparatus, generally indicated at 18, for supplying thermoplastic working material to the extrusion system. The discharge end of the extruder barrel 14 opposite the material intake end has a central discharge opening coaxial with the conveyor screw through which the molten thermoplastic material is delivered to the intake side of a gear pump 20, usually through an intervening filtration device such as a so-called screen changer (not shown). The gear pump 20 is of the conventional type having an outer body or housing interiorly supporting a pair of counter-rotating intermeshing gears (not shown) which convey the incoming thermoplastic material in a positive displacement manner along the housing wall surfaces bounding the gears within the cavities defined by the gear teeth. The thermoplastic material thusly conveyed by each gear rejoins to form a single stream of material which is discharged at the opposite outlet side of the gear pump 20. In each prior art arrangement, the gears of the gear pump 20 are driven by an electric drive motor 22 through a gear reduction unit 24 connected to the shaft of one of the intermeshing gears of the gear pump 20.

The discharge side of the gear pump 20 is communicated with the inlet side of a suitable extruding die 26, which may be of any conventional type and configuration to produce the desired extruded product. For illustrative purposes and by way of example only, a flat sheet-type product P is shown to be discharged from the die 26. Upon discharge from the die 26, the extruded product P is delivered to a so-called puller unit 28 which continuously draws the extruded product from the die 26 by means of an opposed pair of conveyor belts 30 driven by a variable speed drive motor (not shown).

As is conventional, a central controller 32, preferably in the form of a microprocessor or other suitable programmable controller, is provided to control the operation of the gravimetric hopper apparatus 18, the extruder motor 16, the gear pump drive motor 22, and the puller unit drive motor according to a predetermined control program stored in the controller 32, by means of the assistance of various sensors (also not shown) associated with the described apparatus.

In the extruder assembly 10 of FIG. 1, the gear pump 20, its drive motor 22, and its gear reduction unit 24 are rigidly mounted to a base plate 34, which in turn is fixed to the floor F in common with the respective supporting frames of the extruder assembly 12, the die 26, and the puller unit 28, which, as those persons skilled in the art will recognize and understand, ensures that the gear pump 20 is maintained in exact coaxial alignment with the extrusion screw 15 and the die 26. FIG. 2 depicts an alternative mounting system wherein the gear pump drive motor 22 is supported on a stationary floor-standing frame 36 situated to one side of the extruder assembly 12 and the die 26 with the gear reduction unit 24 and the gear pump 20 extending laterally in cantilevered fashion to orient the gear pump 20 in coaxial alignment between the extruder screw 15 and the die 26. In the case of each of the mounting systems of FIGS. 1 and 2, it will be understood that, in order to service the gear pump assembly, the apparatus must be disassembled, at least in part, and in turn the gear pump 20 must be realigned with the extruder screw 15 and the die 26 upon reassembly essentially in the same manner as during original set-up of the extrusion line.

In the prior art extruder system 10 of FIG. 3, the gear pump 20, its drive motor 22, and its gear reduction unit 24 are mounted to the frame 38 of a cart assembly 40 which is supported on lockable casters 42. In this manner, when servicing, repair or other maintenance of the gear pump assembly is necessary, the gear pump 20 need only be detached from the extruder assembly 12 and the die 26 and the cart assembly 40 moved out of the extrusion line. However, just as with the mounting arrangements of FIGS. 1 and 2, substantially complete adjustment and realignment of the gear pump 20 must be accomplished upon return of the cart assembly 40 to the extrusion line, in much the same manner as during original set-up of the extruder system.

Figure 4:
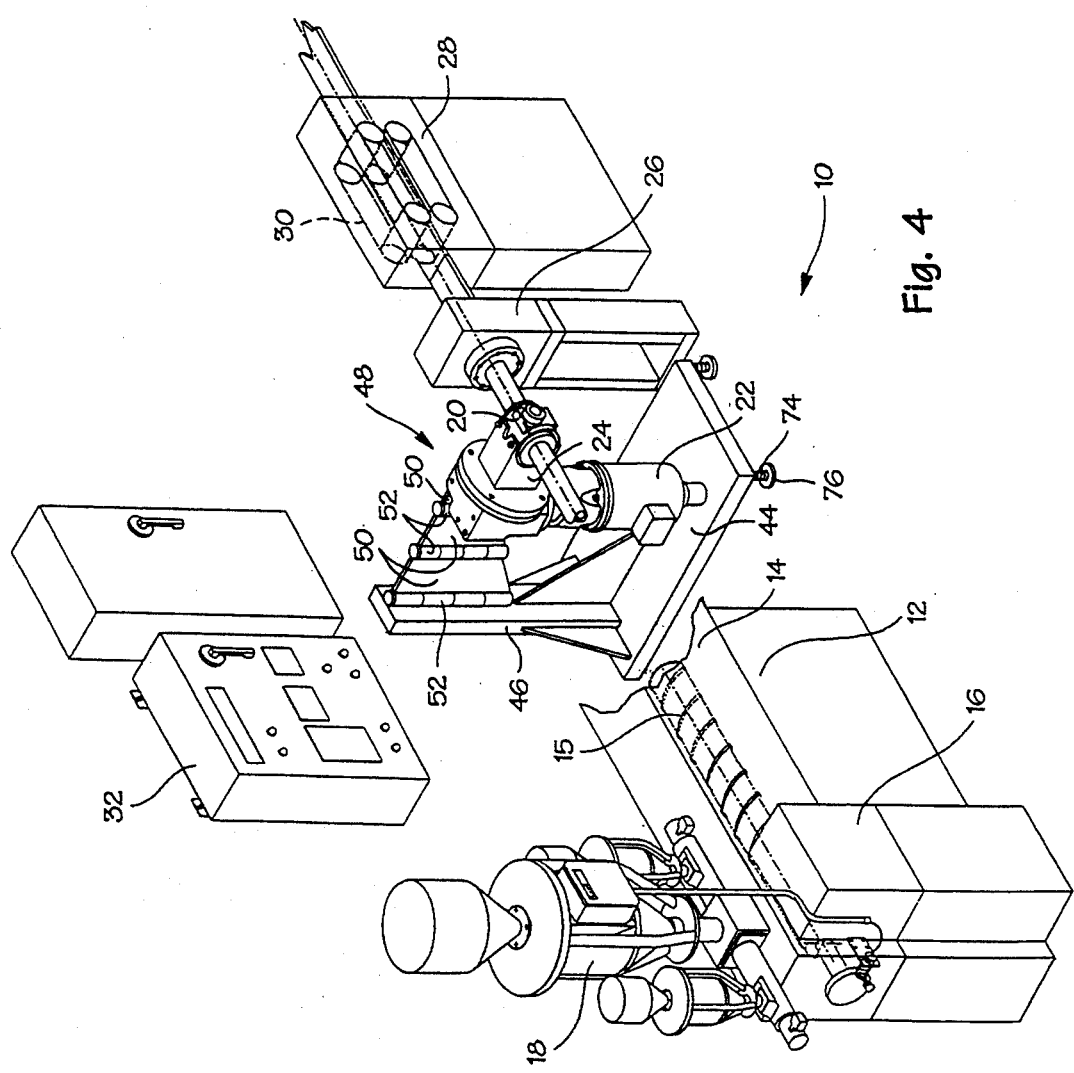
FIG. 4 is a similar perspective view, illustrating the gear pump mounting assembly of the present invention as installed in an otherwise conventional extrusion line.

As shown in FIG. 4, the present invention in substantial contrast provides a mounting structure by which the gear pump 20, its drive motor 22, and its gear reduction unit 24 are swingably supported for articulated movement into and out of operative disposition in alignment with the extruder 12, which substantially obviates the conventional need and disadvantage of complete realigning of the gear pump 20. Specifically, the mounting arrangement of the present invention provides a frame 44 having an upright stanchion 46 to which an articulable arm assembly 48 is affixed to extend laterally in cantilevered fashion. The articulable arm assembly 48 has a plurality of substantially flat rigid plates 50 oriented in substantially vertical disposition and pivoted edge-to-edge with one another and with the stanchion 46 by a series of hinges 52 enabling the plates 50 to individually pivot about parallel vertical axes. An assembly of a drive motor 22 and a gear reduction unit 24 is rigidly affixed in depending fashion to one side face of the outwardmost distal plate 50 from the stanchion 46.

Figure 5:
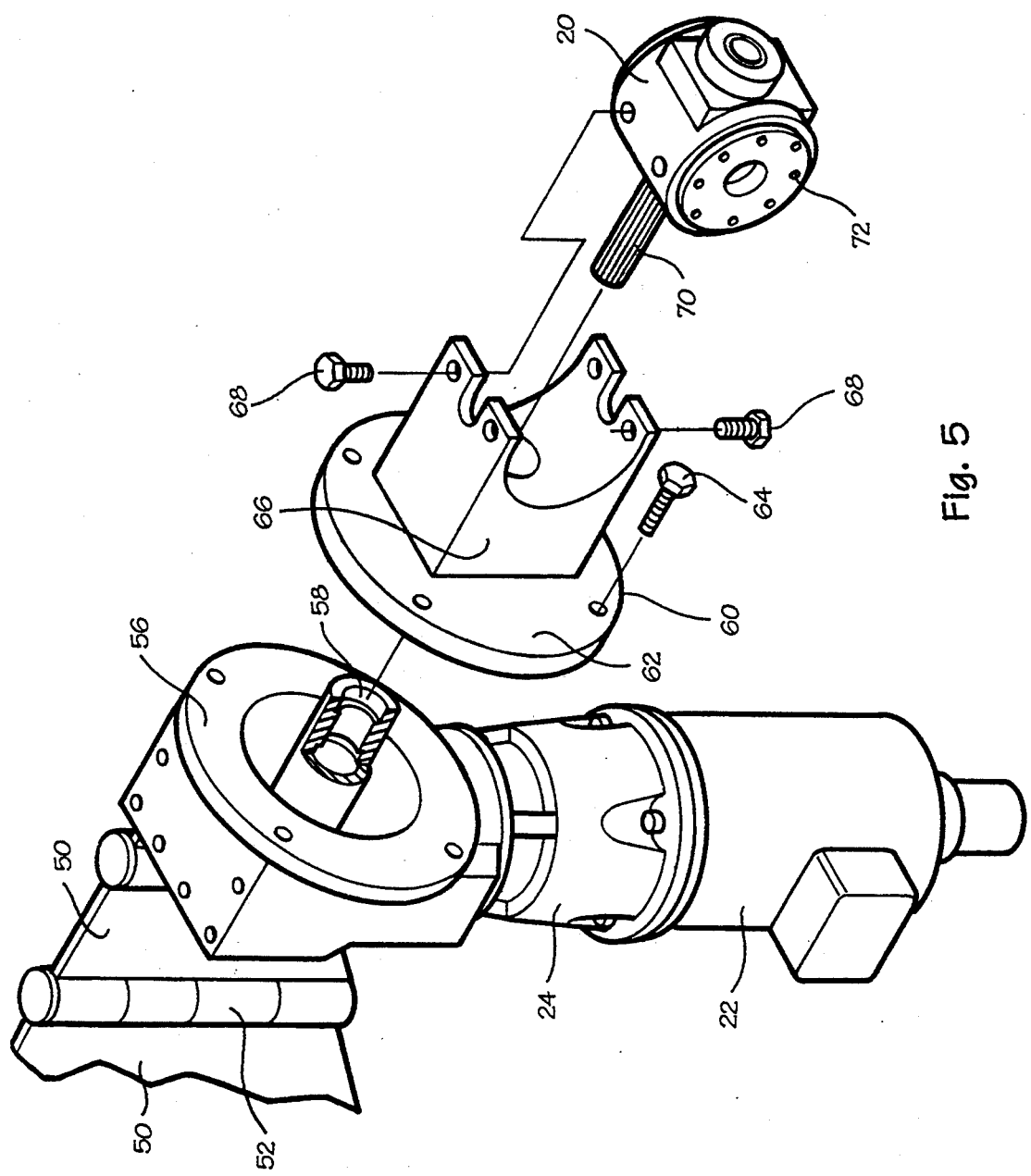
FIG. 5 is a partial exploded perspective view of the gear pump mounting assembly of FIG. 4.

As best seen in FIG. 5, the gear reduction unit 24 has an output drive shaft 54 which projects horizontally outwardly through a central opening in a mounting flange 56. As necessary or desirable, the drive shaft 54 may be in the form of an adapter shaft keyed or otherwise connected to an output shaft of the gear reduction unit 24. The drive shaft 54 has a female bore 58 formed axially in the end of the shaft 54. A pump mounting bracket 60 is affixed to the mounting flange 56 of the gear reduction unit 24 by a circular base flange 62 and a plurality of mounting bolts 64 which extend through and secure the flanges 56,62 in face-abutting relation. An essentially square pump-support housing 66 extends centrally from the outward face of the base flange 62, the base flange 62 having a central opening and the housing 66 being essentially hollow for extension of the gear reduction unit drive shaft 54 outwardly through the housing 66. The lateral sides of the housing 66 are formed with curved outward edges conforming to the shape of the housing of the gear pump 20, which is secured within the housing 66 by a plurality of bolts 68 extending through the upper and lower sides of the housing 66 and into the housing of the gear pump 20. The gear pump 20 has an input shaft 70, preferably splined or otherwise formed to be matingly received within the bore 58 of the gear reduction unit drive shaft 54 for essentially automatic alignment of the gear pump 20 relative to the gear reduction unit 24. As will be understood, the gear pump input shaft 70 could alternatively be formed as a female receptor shaft or equipped with an adapter shaft to receive a splined male output shaft from the gear reduction unit 24. In any case, the housing 66 is constructed to suitably fine tolerances to ensure correct alignment of the gear pump 20 to the gear reduction unit 24 upon mounting of the gear pump 20 to the housing 66. The opposite front and rear housing faces 20' of the gear pump 20 are formed with a circular series of threaded bores 72 for bolted affixation to mounting flanges of the extruder assembly 12 and the die 26 (FIG. 4).

The frame 44 is supported on four adjustable legs 74 preferably in the form of threaded rods extending vertically through the four corners of the frame 44 for individual adjustment of the height and levelness of the frame 44. The lower end of each support leg 74 carries a circular disk-shaped foot 76 to rest on the floor or other supporting surface on which the present mounting apparatus is to be installed. As an alternative, the frame 44 could be supported on lockable height-adjustable casters, but since the frame 44 is not intended to be moved after installation, the rigid support legs 74 are considered preferable.

Installation and operation of the gear pump mounting apparatus of the present invention may thus be understood. During initial set-up of a thermoplastic extrusion line as representatively depicted in FIG. 4, the mounting assembly of the present invention is disposed intermediate the extruder assembly 12 and the die 26. By a combination of fine positioning of the frame 44 and adjustment of the support legs 74, the disposition of the gear pump 20 is aligned precisely with, and is mounted to, the discharge end of the extruder assembly 12, following which the die 26 is similarly mounted in alignment with the gear pump 20. As will be understood, the adjustable legs 74 provide security against unintended shifting movement of the apparatus out of alignment. Following set-up, operation of the extruder assembly can proceed continuously until repair, routine maintenance, or some other change is necessitated in the extrusion system. When the gear pump 20 is so affected, the articulable arm assembly 48 of the present apparatus enables the gear pump 20 to be detached from the extruder assembly 12 and the die 26 and, after minimal movement of the die 26 away from the gear pump 20, the articulable arm assembly 48 can be manipulated to pivot the gear pump 20, its drive motor 22, and its gear reduction unit 24 unitarily outwardly away from the extrusion line for servicing. Since the supporting frame 44 remains in the same disposition in which it was adjusted during original set-up of the extrusion line, the relative orientation of the gear pump 20 to the extruder 12 is not changed and, thus, upon articulation of the arm assembly 48 to return the gear pump 20 to the extrusion line, the gear pump 20 will automatically realign with the extruder assembly 12, thereby eliminating or at least greatly minimizing any need for realignment or adjustment of alignment of the gear pump 20 with the extruder 12. Since, as aforementioned, the female bore 58 in the gear reduction drive shaft 54 similarly permits relatively simple and easy alignment of the gear pump 20 with the gear reduction unit 24 upon mounting of the gear pump 20 to the mounting bracket 60, the overall mounting apparatus of the present invention provides essentially a completely self-aligning gear pump assembly.

The advantages of the present gear pump mounting assembly should be readily apparent to a person of ordinary skill in the art. As will be recognized, the mounting apparatus of the present invention is of a simple, compact design with relatively few mechanically moving components which will contribute to simple and easy installation and operation, reduced long-term maintenance time and expense, and an increased useful life of the apparatus. In operation, the self-aligning capabilities of the present apparatus will reduce set-up time and minimize maintenance down-time, which in turn will contribute to greater operating efficiency and reduced operating costs. In addition, the simplicity of the present apparatus should itself provide a reduction in the costs of the gear pump mounting structure itself.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In a thermoplastic material extrusion line of the type comprising a melt extruder, a gear pump receiving and pumping melted thermoplastic material discharged from the extruder, and a die through which the melted thermoplastic material is pumped by the gear pump, a mounting assembly for supporting the gear pump for swinging movement into and out of operative disposition in alignment with the extruder, the mounting assembly comprising a frame for fixed disposition adjacent the extruder, an articulable arm extending from the frame, and a support structure affixed to the arm for mounting the gear pump to be articulably movable with the arm into and out of an operative position aligned with the extruder.

2. A gear pump mounting assembly in a thermoplastic material extrusion line according to claim 1, wherein the articulable arm includes at least one hinge device for pivoting movement of the gear pump.

3. A gear pump mounting assembly in a thermoplastic material extrusion line according to claim 1, wherein the articulable arm includes a plurality of hinge devices for pivoting movement of the gear pump.

4. A gear pump mounting assembly in a thermoplastic material extrusion line according to claim 1, wherein the frame includes a base for stationary affixation to a common supporting surface with the extruder so that the relative disposition of the gear pump to the extruder is controlled exclusively by articulated movement of the arm, whereby during articulated movement of the gear pump from operative disposition aligned with the extruder, the gear pump is maintained in correct orientation for realignment with the extruder upon reversal of the articulated movement.

5. A gear pump mounting assembly in a thermoplastic material extrusion line according to claim 1, wherein the support structure of the articulable arm includes a mount for a gear pump drive assembly, the gear pump being affixed to the drive assembly.

6. A gear pump mounting assembly in a thermoplastic material extrusion line according to claim 5, wherein the drive assembly includes a drive shaft and the gear pump includes an input shaft, one of the drive shaft and the input shaft having an axial bore to receive the other shaft upon mounting of the gear pump to the support structure.

7. A gear pump mounting assembly in a thermoplastic material extrusion line according to claim 6, wherein the axial bore of the one shaft and the other shaft mate with one another for integral driving connection thereof.

8. A gear pump mounting assembly in a thermoplastic material extrusion line according to claim 5, wherein the gear pump drive assembly comprises a drive motor and a gear reduction unit, the gear pump being affixed to the gear reduction unit.

* * * * *

UNITED STATES PATENT AND TRADEMARK OFFICE
CERTIFICATE OF CORRECTION

PATENT NO. : 5,433,593

DATED : July 18, 1995

INVENTOR(S) : Daniel E. Berger

It is certified that error appears in the above-identified patent and that said Letters Patent is hereby corrected as shown below:

Column 1, line 16, after "the" delete ",".

Column 2, line 6, delete "ill" and insert therefor -- in --.

Signed and Sealed this

Eighteenth Day of June, 1996

Attest:

BRUCE LEHMAN

*Attesting Officer*   *Commissioner of Patents and Trademarks*